United States Patent [19]

Naum

[11] Patent Number: 4,974,132
[45] Date of Patent: Nov. 27, 1990

[54] LIGHT TRAP FOR ARC LAMP VENTILATING SYSTEM

[76] Inventor: Daniel Naum, 2048 Midvale Dr., San Diego, Calif. 92105

[21] Appl. No.: 468,270

[22] Filed: Jan. 22, 1990

[51] Int. Cl.$^5$ .............................................. E21V 29/00
[52] U.S. Cl. ................................... 362/261; 362/294; 362/373
[58] Field of Search ................ 362/261, 294, 354, 373

[56] References Cited

U.S. PATENT DOCUMENTS

| | | | |
|---|---|---|---|
| 1,758,290 | 5/1930 | McCormack | 362/373 |
| 2,279,920 | 4/1942 | Howell | 362/373 |
| 2,287,328 | 6/1942 | Rose | 362/373 |
| 2,307,302 | 1/1943 | Richardson | 362/373 |
| 2,368,781 | 2/1945 | Rose | 362/373 |
| 2,618,738 | 11/1952 | Foulds | 362/373 |
| 4,658,338 | 4/1987 | Bertozzi | 362/373 |
| 4,692,844 | 9/1987 | Galerne | 362/373 |

Primary Examiner—Ira S. Lazarus
Assistant Examiner—Richard R. Cole

[57] ABSTRACT

The trap is used to allow the high flow of ventilation air through an exhaust opening in the housing of a large arc lamp, while at the same time preventing the escape of light through this opening, and most particularly eliminating the escape of ultraviolet light. The trap is box-shaped, and fits over the ventilation openings in the top and bottom of the arc lamp housing, with each side of the box being comprised of a honeycomb panel coated with a flat black high-temperature light-absorbing material, and the top rectangular honeycomb panel having an opaque sheet passing across its top.

5 Claims, 1 Drawing Sheet

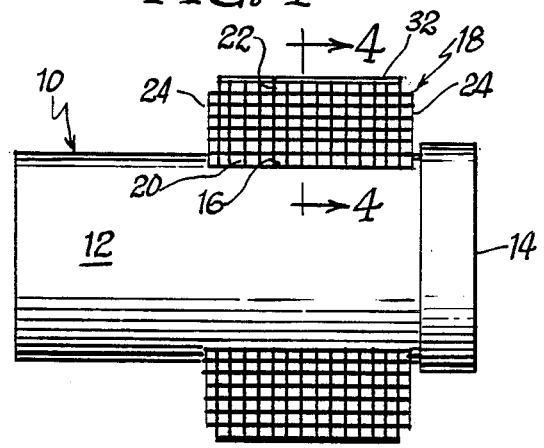
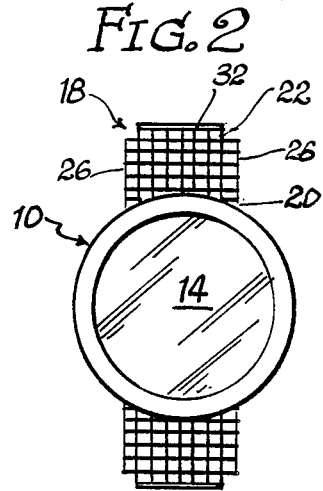
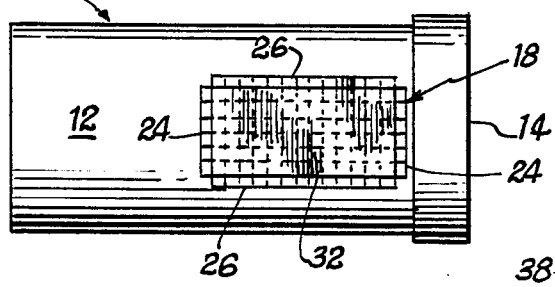
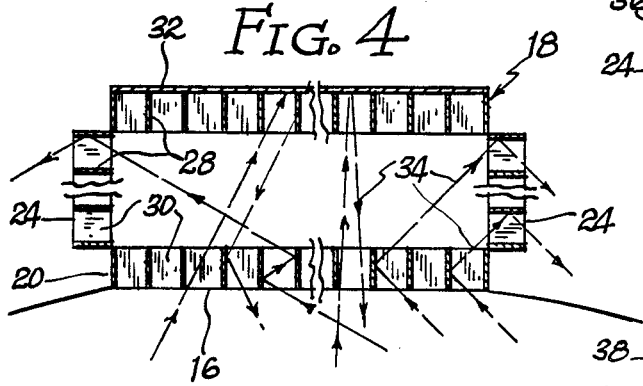
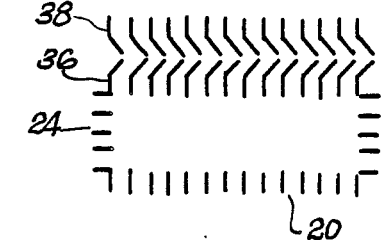
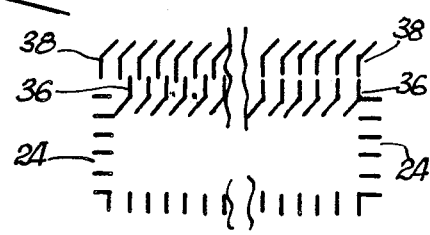

LIGHT TRAP FOR ARC LAMP VENTILATING SYSTEM

BACKGROUND OF THE INVENTION

The instant invention is in the field of ventilation systems for high-wattage light equipment, and particularly pertains to HMI arc lamps in the 12 thousand to 18 thousand watt range used primarily for illuminating theater sets and stages, and location lighting.

Arc lamps of this power produce an enormous amount of heat. At the same time, the arc lamp bulb itself must be cooled to a certain extent, or it will quickly burn out. Typically, the lamps bases must be maintained to no more than 280 degrees centigrade.

By providing a large fan or blower, amply-sized openings for air intake and exhaust, the lamps can be maintained sufficiently cooled to function for a long period before they finally burn out. However, the necessity of having large ventilation openings causes yet another problem. That problem is the necessity to trap the light at the ventilation opening so that harmful ultra-violet light does not escape the lamp housing and damage the eyes of personnel working around the lights.

SUMMARY OF THE INVENTION

The instant invention resolves the problem of the large ventilation openings by providing light traps adequate to stop the exit of all significant amounts of radiation from within the lamp housing.

The light trap consists of a box being proportioned about comprises a rectangular honeycomb panel, having a multiplicity of vanes formed into a reticulated grid, with openings passing substantially perpendicularly through the path so that light and air can pass relatively unobstructed perpendicularly to each panel, but the panels become more and more opaque as the impinging radiation strikes the panel at a greater and greater angle.

The top panel is covered with an opaque sheet to prevent the direct exit straight up through the box, and all of the vanes are covered with a light-absorbent material. The vanes are dimensioned and spaced apart such that light impinging into the box from the bottom will be required to reflect at least three times on the absorptive surfaces of the vanes of the honeycomb panels before exit through the sides or in walls of the box.

DETAILED DESCRIPTION OF THE DRAWINGS

FIG. 1 is a side elevation view of a high intensity arc lamp with the light trap in place;

FIG. 2 is an end elevation of the arc lamp with the light trap in place as would be seen from the right side of FIG. 1;

FIG. 3 is a top plan view of the lamp and trap as shown in FIGS. 1 and 2;

FIG. 4 is a diagrammatic illustration and ray diagram illustrating typical paths that light might follow in order to exit the light trap;

FIG. 5 is a diagrammatic illustration of a variation of the top sheet of the trap; and FIG. 6 is a composite diagrammatic illustration of two further variations of the configuration of the top sheet of the trap.

DETAILED DESCRIPTION OF THE PREFERRED EMBODIMENT

A high intensity arc lamp is shown at 10. The only parts of the arc lamp that are shown in the illustrations are the housing 12 and the open, light-emitting end 14 of the lamp.

The housing 12 defines an exhaust opening 16 in the top. A similar opening is provided in the bottom, but only the top opening and trap will be discussed as the bottom trap is substantially identical to the top one.

The invention comprises a basic box 18 having a floor panel 20, a top panel 22, end wall panels 24 and side panels 26. Each of the panels is made from a honeycomb material constituting a reticulated grid of vanes 28 which define a multiplicity of openings 30 passing orthogonally through the respective panel. In addition, the top panel 22 is covered by an opaque sheet 32. All of the surfaces of the box, with the possible exception of the top of sheet 32, are coated with a light-absorbing material, or treated in such a way that the surfaces are blackened to absorb light.

The individual panels can be brazed together, mounted on a frame, or otherwise held together such that they retain their box shape. There is little stress or force that would be exerted upon the box in the ordinary course of its use, so that enormous strength is not required.

The individual vanes 28 are of sufficient width and they are spaced closely enough together so that the openings 30 are sufficiently narrow, that all of the light rays 34 which impinge on the box from beneath it through the floor panel 20, must impact on at least three darkened, light-absorbing surfaces before they can exist through the end wall panels or side panels of the box. This illustrated in FIG. 4, in which the light rays 34 are clearly shown to require at least three bounces no matter what angle they strike when entering the box. At some angles, the light rays will never escape at all.

At the same time, for ventilation purposes, the opening 16 in the top of the light housing, is substantially unobstructed. Air may exhaust through this opening up through the floor panel 20 and through any of the end wall panels and side panels 24 and 26, yielding ample respiration capabilities for the ventilating system.

FIGS. 5 and 6 illustrate three variations in which the top sheet would allow air to pass through but still block light. All three variations could be made by using a first sheet 36 with deflected vanes, and then mounting an inverted sheet 38 on the first sheet. FIG. 6 is split to show the sheets aligned on the right, and a variation in which the vanes are staggered is shown on the left side of that figure.

I claim:

1. A light trap for a ventilation system for an arc lamp in which the arc lamp has a housing with a hot air exhaust opening therein, said light trap comprising:
    (a) a six-sided box mounted on said housing such that said box covers said exhaust opening;
    (b) each of the sides of said six-sided box comprising a honeycomb panel which permits the substantially unobstructed passage of light therethrough only in the direction orthogonal thereto;
    (c) each of said honeycomb panels having light-absorbing surfaces; and
    (d) one of said panels being a top panel and being positioned substantially opposite said exhaust opening and being covered by an opaque sheet to prevent light from passing directly therethrough into the environment.

2. A light trap according to claim 1 wherein each of said honeycomb panels is defined by a grid of vanes defining orthogonal openings and said vanes are dimensioned and spaced to insure that all light rays entering said box through the bottom thereof impinge on at least three surfaces of said box prior to passing through one of said honeycomb panels to the ambient environment.

3. A light trap according to claim 1 wherein said honeycomb panels are comprised of a reticulated grid of vanes defining square openings.

4. A light trap for a ventilation system for an arc lamp in which the arc lamp has a housing with a hot air exhaust opening therein, said light trap comprising:
  (a) a six-sided box mounted on said housing such that said box covers said exhaust opening;
  (b) each of the sides of said six-sided box comprising a honeycomb panel which permits the substantially unobstructed passage of light therethrough only in the direction orthogonal thereto;
  (c) each of said honeycomb panels having light absorbing surfaces; and
  (d) one of said panels being a top panel and being positioned substantially opposite said exhaust opening and having vanes which are deflected in a uniform pattern such that direct light will not pass therethrough but air can pass through substantially unobstructed.

5. A light trap according to claim 4 wherein said top panel comprises two sheets of honeycomb material with one inverted over the other such that the two are back-to-back.

* * * * *